US009441347B2

(12) United States Patent
West

(10) Patent No.: US 9,441,347 B2
(45) Date of Patent: Sep. 13, 2016

(54) METHODS AND APPARATUS TO CONTROL A DUAL FUNCTION WORK MACHINE

(71) Applicant: Deere & Company, Moline, IL (US)

(72) Inventor: Sean P. West, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 170 days.

(21) Appl. No.: 13/959,342

(22) Filed: Aug. 5, 2013

(65) Prior Publication Data

US 2015/0039163 A1    Feb. 5, 2015

(51) Int. Cl.
| | |
|---|---|
| *B60W 10/26* | (2006.01) |
| *E02F 9/20* | (2006.01) |
| *B60W 10/06* | (2006.01) |
| *B60W 10/08* | (2006.01) |
| *B60W 10/30* | (2006.01) |
| *B60W 20/00* | (2016.01) |
| *E02F 9/26* | (2006.01) |
| *E02F 3/96* | (2006.01) |

(52) U.S. Cl.
CPC ............ *E02F 9/2075* (2013.01); *B60W 10/06* (2013.01); *B60W 10/08* (2013.01); *B60W 10/26* (2013.01); *B60W 10/30* (2013.01); *B60W 20/13* (2016.01); *B60W 20/40* (2013.01); *E02F 3/964* (2013.01); *E02F 9/2091* (2013.01); *E02F 9/26* (2013.01); *E02F 9/268* (2013.01); *Y10S 903/93* (2013.01)

(58) Field of Classification Search
CPC ..................................................... E02F 9/2075
USPC .................................. 701/22; 903/930; 477/5
See application file for complete search history.

(56) References Cited

U.S. PATENT DOCUMENTS

| | | | |
|---|---|---|---|
| 5,092,408 | A | 3/1992 | Tatara et al. |
| 6,591,176 | B1 * | 7/2003 | Perry et al. ..................... 701/45 |
| 6,789,335 | B1 | 9/2004 | Kinugawa et al. |
| 6,864,663 | B2 | 3/2005 | Komiyama et al. |
| 7,086,226 | B2 | 8/2006 | Oguri |
| 2005/0001606 | A1 | 1/2005 | Kagoshima |
| 2009/0012679 | A1 * | 1/2009 | Prasetiawan ............ E02F 9/166 701/50 |

(Continued)

FOREIGN PATENT DOCUMENTS

WO    2007043953    4/2007

OTHER PUBLICATIONS

Eaton Corporation, "Medium-Duty Hybrid Electric System", 2009, [http://www.eaton.com/ecm/groups/public/@pub/@eaton/@hyd/documents/content/ct_243198.pdf], accessed on Jun. 16, 2015, 2 pages.

Intellectual Property Office of Great Britain. "Combined Search and Examination Report under section 17 and 18 (3)", issued in connection with British patent application No. GB1408001.4, issued on Nov. 18, 2014, 6 pages.

(Continued)

*Primary Examiner* — Chun Cao
*Assistant Examiner* — Sumil Desai
(74) *Attorney, Agent, or Firm* — Hanley, Flight & Zimmerman, LLC

(57) ABSTRACT

Methods and apparatus are disclosed for controlling power for a work machine. An example method disclosed herein includes identifying an energy storage level of an energy storage device; identifying a transmission setting of the work machine; and determining whether to control a function of the work machine using power from the energy storage device or power from a second power source different from the energy storage device based on the energy storage level and the transmission setting.

19 Claims, 5 Drawing Sheets

(56) References Cited

U.S. PATENT DOCUMENTS

| | | |
|---|---|---|
| 2009/0018716 A1 | 1/2009 | Ambrosio |
| 2009/0236156 A1* | 9/2009 | Promersberger et al. ... 180/53.4 |
| 2009/0313862 A1* | 12/2009 | Wakuta .................. E02F 3/964 37/403 |
| 2010/0293913 A1* | 11/2010 | Mackin ................ A01D 43/105 56/10.2 R |
| 2012/0167561 A1 | 7/2012 | Ono et al. |
| 2012/0302397 A1 | 11/2012 | Habbani |
| 2012/0323429 A1* | 12/2012 | Bissontz ............... B66F 11/044 701/22 |
| 2013/0180264 A1 | 7/2013 | Daniels |
| 2014/0053683 A1* | 2/2014 | West et al. ...................... 74/661 |

OTHER PUBLICATIONS

"Hybrid Electric," Jun. 2009, 2 pages, Eaton Corporation, USA.
United Kingdom Intellectual Property Office, "Examination Report under Section 18(3)", issued in connection with GB Application No. 1408001.4, issued on Jun. 23, 2016, 3 pages.

* cited by examiner

METHODS AND APPARATUS TO CONTROL A DUAL FUNCTION WORK MACHINE

FIELD OF THE INVENTION

This disclosure relates generally to operating a work machine, and, more particularly, to controlling power to a function of the work machine.

BACKGROUND

Many work machines, include more than one mechanical function (e.g., a loader, a backhoe, etc.). Generally speaking, a main power source (e.g., an internal combustion engine) is used to power the machine and/or any hydraulic pump(s) on the machine. The hydraulic pumps are typically used to actuate hydraulic piston(s) on the functions to perform tasks (e.g., dig, lift, dump, etc.). Controls for the hydraulic piston(s) are typically located in an operator station of the work machine. The operator station may include controls for the one or more functions as well as controls for maneuvering the work machine.

SUMMARY

An example method disclosed herein includes identifying an energy storage level of an energy storage device; identifying a transmission setting of the work machine; and determining whether to control a function of the work machine using power from the energy storage device or power from a second power source different from the energy storage device based on the energy storage level and the transmission setting.

An example apparatus disclosed herein includes a battery monitor to identify an energy storage level of an energy storage device, a transmission monitor to identify a transmission setting of the work machine, and a power analyzer to determine whether to control a function of the work machine using power from the energy storage device or from a second power source different from the energy storage device based on the energy storage level and the transmission setting An example machine readable storage medium is disclosed herein having machine readable instructions which when executed cause a machine to identify an energy storage level of an energy storage device, identify a transmission setting of the work machine, and determine whether to control a function of the work machine using power from the energy storage device or power from a second power source different from the energy storage device based on the energy storage level and the transmission setting.

DETAILED DESCRIPTION

Methods and apparatus for controlling power to a function (e.g., a backhoe) of a work machine are disclosed. Based on the state of the work machine, the function is controlled using power from a primary power source (e.g., an internal combustion engine (ICE)) and/or a secondary power source (e.g., a battery). An example method described herein identifies an energy level of a battery, a transmission setting, and/or an operator station configuration, and determines whether to control the function using power from an internal combustion engine or a battery.

The example methods, apparatus, and article of manufacture described herein enable an operator to control a machine using power from an ICE and/or a battery. In the illustrated examples, safety measures are considered for control of the work machine. For example, power from the battery may be used during an emergency shutdown of the ICE, even if the battery is below a minimum state of charge. As another example, control of the functions are enabled or disabled based on a configuration of an operator work station and/or the transmission settings of the work machine (i.e., a function cannot be used if the transmission is not in the appropriate gear and/or control position and a seat position is directed to control the function).

As described herein, when a function of the work machine utilizes power from a battery, a noise level of operating the function may be considerably lower than when using power from an alternative or secondary power source, such as an ICE. Accordingly, in such examples, the function may be operated during times that the function cannot be operated using power from the alternative or secondary source (e.g., during restricted time periods enforced to minimize construction nuisance) because the function being operated by battery is quieter than the function being operated using power from the ICE.

Figure 1:
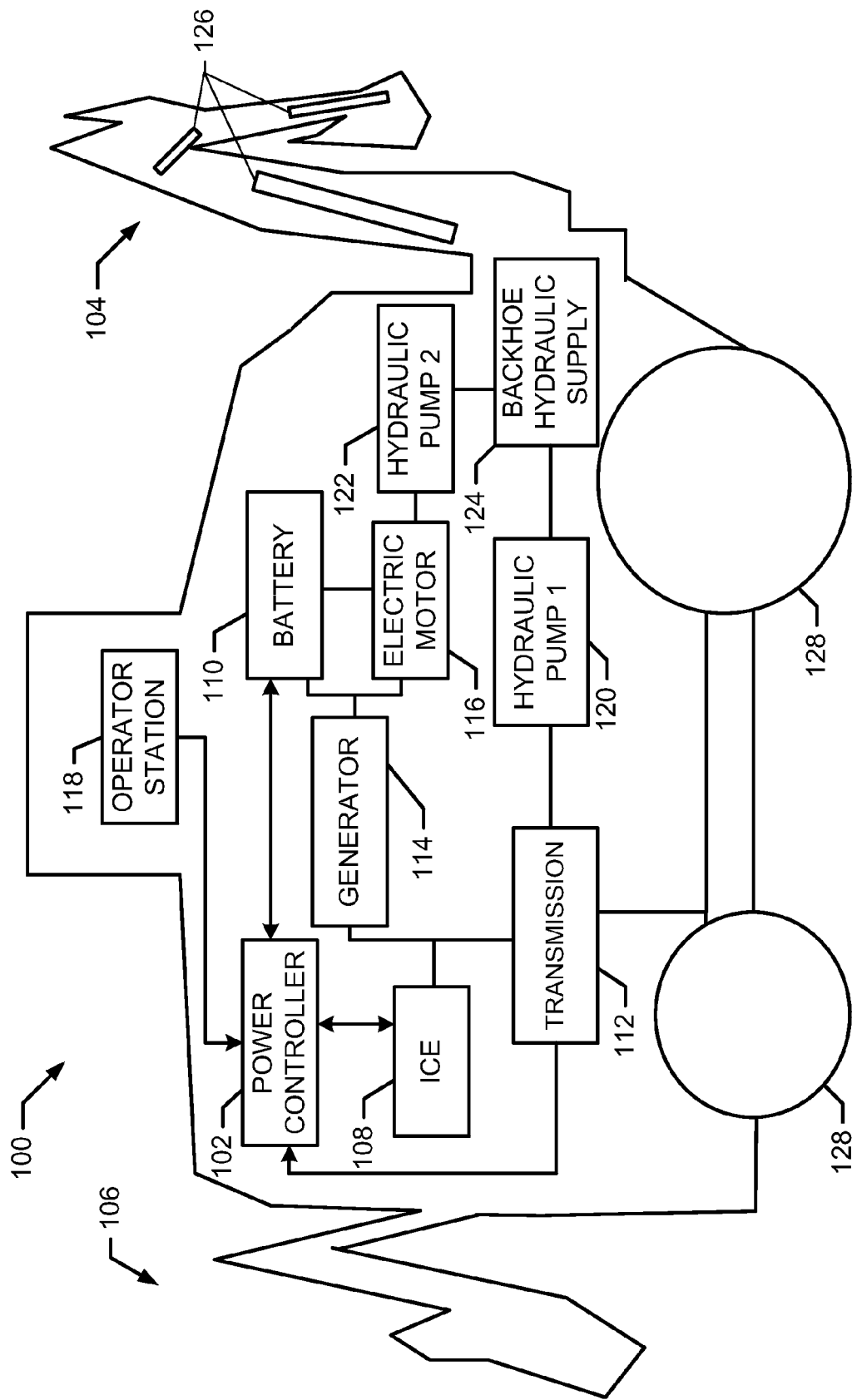
FIG. 1 is a schematic illustration of an example work machine including an example power controller constructed in accordance with the teachings of this disclosure.

FIG. 1 is a schematic illustration of an example work machine 100 including a power controller 102 to control power to a backhoe 104 of the work machine 100. The example work machine 100 includes two example functions: (1) the backhoe 104 and (2) a loader 106, though other functions may be additionally or alternatively included in other examples of the work machine 100. Although the example of FIG. 1 illustrates power control to the backhoe 104, the power may be controlled to the backhoe 104 and/or the loader 106 or any other type of function (e.g., Power Take Off (PTO) hitch, plow, etc.) of the work machine 100 that may be implemented by the work machine 100 but is not shown. The example work machine 100 includes the power controller 102, the backhoe 104, the loader 106, an ICE 108, a battery 110, a transmission 112, a generator 114, an electric motor 116, an operator station 118, a first hydraulic pump 120, a second hydraulic pump 122, a hydraulic supply 124, hydraulic piston(s) 126, and ground engaging elements 128 (illustrated as wheels).

In FIG. 1, the power controller 102 controls power to the backhoe 104. The power controller 102, as further described below in connection with FIG. 2, monitors the state of the work machine 100 to determine which of the hydraulic pumps 120, 122 is to be used to operate the hydraulic piston(s) 126 of the backhoe 104 using fluid from the hydraulic supply 124. In one example, the power controller 102 monitors a transmission setting (e.g., an engaged gear and/or control setting for the gear (e.g., forward, neutral, reverse, etc.)) of the transmission 112, the energy levels of the battery 110, a status of the ICE 108 (running, shut down, experiencing failure, in an emergency state, etc.), and/or a configuration of the operator station 118 (e.g., an operator seat facing the loader 106 (forward) or facing the backhoe 104 (backward)).

The example ICE 108 of FIG. 1 may be a diesel or gasoline powered engine. In some examples, another type of power source may additionally or alternatively be used. The ICE 108 provides power to the ground engaging elements 128 for maneuverability of the work machine 100. In the illustrated example of FIG. 1, the ICE 108 provides power to the generator 114 and/or power through the transmission 112 to the first hydraulic pump 120. The generator 114 converts the mechanical energy to electric energy that may be stored in the battery 110 and/or used to power the electric motor 116. In some examples, the generator 114 includes an electro-magnetic rotor that mechanically rotates on an axis generating electricity through induction in a stator of the generator 114 surrounding the rotor. The example electric motor 116 may include an electro-magnetic rotor that spins through induction when electric current is provided to a stator of the electric motor 116 surrounding the rotor. The example battery 110 may be a lithium ion battery or other type of battery that has a storage capacity (e.g., 15 kWh) capable of powering the backhoe 104 and/or the loader 106. The example electric motor 116 may receive the electrical energy from the battery 110 and/or generator 114 and provide power to the second hydraulic pump 122.

The example operator station 118 may be a cab of the work machine 100 that includes controls and/or user interfaces to operate the work machine 100, the power controller 102, the functions 104, 106, etc. In some examples, the operation station 118 has several separate control panels and/or user interfaces that are configured to operate the power controller 102, the plurality of functions (e.g., the loader 104, the backhoe 106, etc.) of the work machine 100. In one example, the operation station 118 includes an operator seat that has multiple positions corresponding to the multiple control configurations. The example operator seat can be adjusted and/or maneuvered into the positions to enable an operator to comfortably control the corresponding function.

In FIG. 1, the first hydraulic pump 120 may be on a hydraulic circuit separate from the second hydraulic pump 122, yet both the first hydraulic pump 120 and the second hydraulic pump 122 may utilize hydraulic fluid in the hydraulic supply tank to control the hydraulic piston(s) 126 of the backhoe 104. The hydraulic piston(s) 126 of the backhoe 104 enable an operator to control the work machine 100 to dig, dump, grab, lift or perform any other similar tasks.

In the illustrated example of FIG. 1, the ICE 108, battery 110, and transmission 112 may include status indicators that provide status information to the power controller 102. For example, the ICE 108 may include a status indicator that indicates whether the engine is running, whether the engine has been manually shutdown, or whether the engine has experienced a failure or is in state of emergency (e.g., unexpected engine shutdown, operating error, out of fuel, etc.); the battery 110 may include a status indicator to indicate the energy storage level of the battery; and the transmission 112 may include a gear indicator that indicates which gear (e.g., forward, neutral, reverse) is engaged and/or a gear control setting for the transmission. The example operator station 118 may include a seat position indicator or function control indicator to indicate which function (e.g., backhoe, loader) an operator is attempting to control, for example by identifying which direction (e.g., forward toward the loader, backward toward the backhoe, etc.) an operator seat is facing. Accordingly, the power controller 102 is communicatively coupled to the ICE 108, battery 110, transmission 112, and operator station 118.

Figure 2:
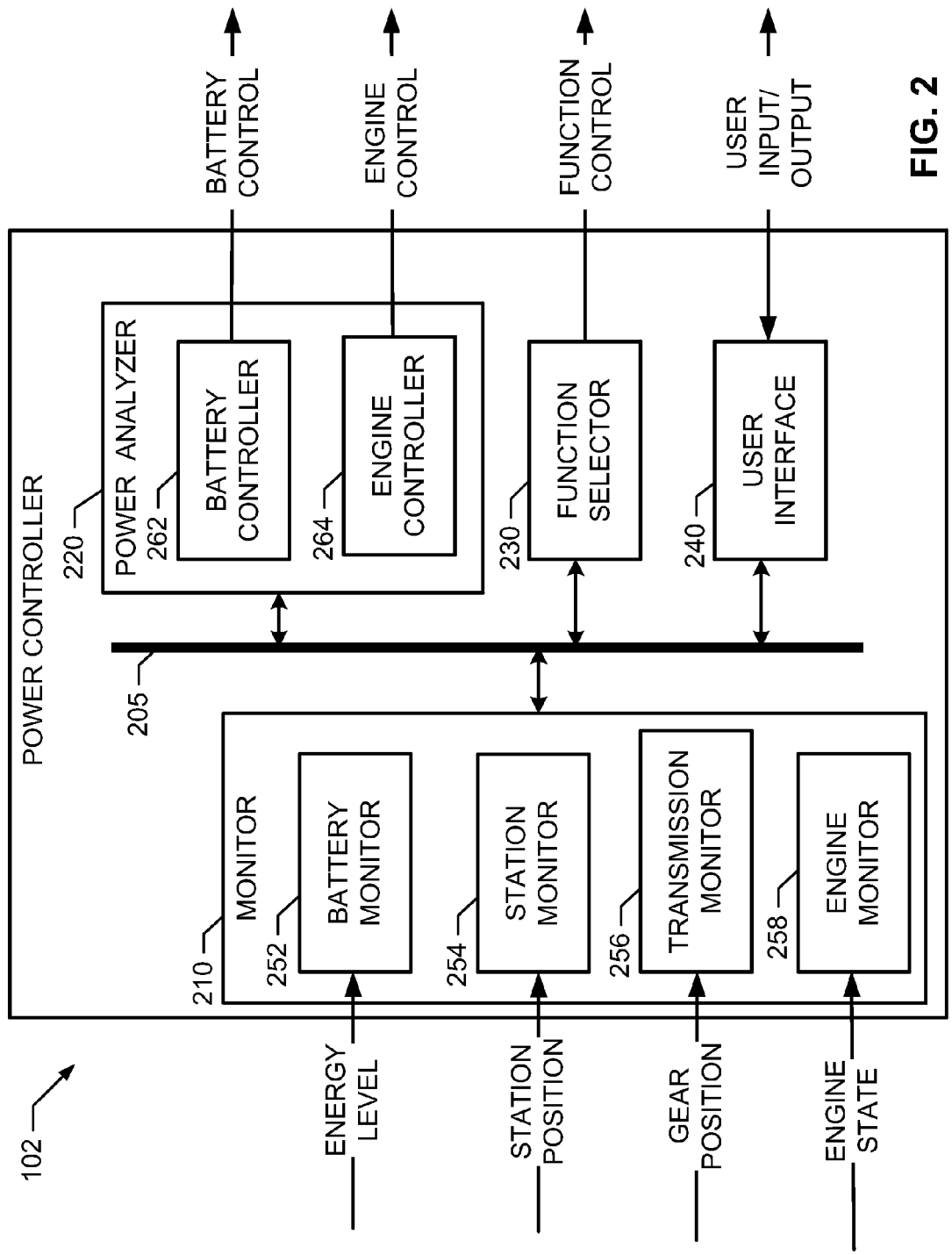
FIG. 2 is a block diagram of an example implementation of the power controller of FIG. 1.

FIG. 2 is a block diagram of an example power controller 102 that may implement the power controller 102 of FIG. 1. The example power controller 102 includes a bus 205, a monitor 210, a power analyzer 220, a function selector 230, and a user interface 240. The example bus 205 facilitates communication between the monitor 210, the power analyzer 220, the function selector 230, and the user interface 240. The example monitor 210 includes a battery monitor 252, a station monitor 254, a transmission monitor 256, and an engine monitor 258. The example control analyzer 220 includes a battery controller 262 and an engine controller 264.

The monitor 210 of FIG. 2 monitors the status of the work machine 100 of FIG. 1. In the illustrated example, the battery monitor 252 retrieves and/or receives energy level information from the battery 110. The station monitor 254 retrieves and/or receives a status (e.g., a seat position or direction, a control position, etc.) of the operator station 118. The transmission monitor 256 retrieves and/or receives a status of the gear position of the transmission 112 (e.g., forward, reverse, neutral, etc.) and/or a location of a gear control (e.g., a control located in the operator station 118 such as a lever/shifter, a user input for an electronic gear control, etc.) of the transmission 112. For example, the transmission monitor 256 may detect that a user may have placed a control (e.g., a transmission control lever) for the transmission 112 in a first gear (e.g., forward) but due to other controls or settings (e.g., safety overrides), the transmission 112 may remain engaged in a second gear (e.g., neutral). The engine monitor 258 retrieves and/or receives a status of the engine state from the ICE 108. The monitor 210 forwards the status information to the power analyzer 220, the function selector 230, and the user interface 240.

The example power analyzer 220 determines which power source is to be used to control a function of the work machine 100. For example, the power analyzer 220 determines whether the ICE 108 is to be used to power the backhoe 104 or the battery 110/electric motor 116 is to be used to power the backhoe 104. In some examples, the power analyzer 220 determines which power source is to be used to power the ground engaging elements 128 and/or loader 106 of the work machine 100. Based on the status information received from the monitor 210, the power analyzer 220 will enable or disable power from the battery 110 via the battery controller 262 and/or enable or disable power from the ICE 108 via the engine controller 264. For example, the power analyzer 220 may instruct the ICE 108 or the battery 120 to power or to enable power to the first hydraulic pump 120 or the second hydraulic pump 122, respectively. Accordingly, the power analyzer 220 may determine which of the hydraulic pumps 120, 122 of FIG. 1 is to be used to control the hydraulic piston(s) 126 of the backhoe 104. In some examples, the hydraulic pumps 120, 122 may be used simultaneously or in conjunction with other hydraulic pumps to actuate the hydraulic piston(s) 126 of the backhoe 104.

Based on the status information received from the monitor, the function selector 230 determines whether to enable or disable control of the one or more functions (e.g., the backhoe, loader, etc.) of the work machine 100. For example, if the seat of the operator station 118 is facing toward the backhoe 104, control of the loader 106 may be disabled. In some examples, the function selector 230 may enable or disable control of a function (e.g., the backhoe 104 or the loader 106) based on the transmission settings received from the transmission monitor 256. Accordingly, the function selector 230 may enable or disable control by enabling or disabling control panels of the respective functions in the operator station 118 or enabling or disabling power from power sources (e.g., the ICE 108, the battery 110) of the work machine 100.

The example user interface 240 facilitates communication with an operator. In some examples, the user interface 240 is located in the operator station 118. The user interface 240 may receive and transmit notifications to the user via a user display. For example, if a user chooses to control a function that is disabled, the user interface 240 may alert the user and/or provide the user with instructions to place the work machine 100 in a state to enable the function. The user interface 240 may include a touchscreen, keyboard, mouse, trackball, etc. to enable the user to adjust settings (e.g., an adjustable range between a minimum state of charge and a maximum state of charge to use the battery 110 to control the backhoe 104) of the power controller 102.

Accordingly, as further discussed in connection with FIGS. 3 and 4, the power controller 102 monitors the work machine 100 and determines a power source and/or enables a function based on the state of the work machine 100.

While an example manner of implementing the power controller 102 of FIG. 1 is illustrated in FIG. 2, one or more of the elements, processes and/or devices illustrated in FIG. 2 may be combined, divided, re-arranged, omitted, eliminated and/or implemented in any other way. Further, the monitor 210, the power analyzer 220, the function selector 230, the user interface 240, the battery monitor 252, the station monitor 254, the transmission monitor 256, the engine monitor 258, the battery controller 262, the engine controller 264 and/or, more generally, the power controller 102 of FIG. 2 may be implemented by hardware, software, firmware and/or any combination of hardware, software and/or firmware. Thus, for example, any of the monitor 210, the power analyzer 220, the function selector 230, the user interface 240, the battery monitor 252, the station monitor 254, the transmission monitor 256, the engine monitor 258, the battery controller 262, the engine controller 264 and/or, more generally, the power controller 102 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the monitor 210, the power analyzer 220, the function selector 230, the user interface 240, the battery monitor 252, the station monitor 254, the transmission monitor 256, the engine monitor 258, the battery controller 262, and/or the engine controller 264 is/are hereby expressly defined to include a tangible computer readable storage device or storage disk such as a memory, a digital versatile disk (DVD), a compact disk (CD), a Blu-ray disk, etc. storing the software and/or firmware. Further still, the power controller 102 may include one or more elements, processes and/or devices in addition to, or instead of, those illustrated in FIG. 2, and/or may include more than one of any or all of the illustrated elements, processes and devices.

Figure 3:
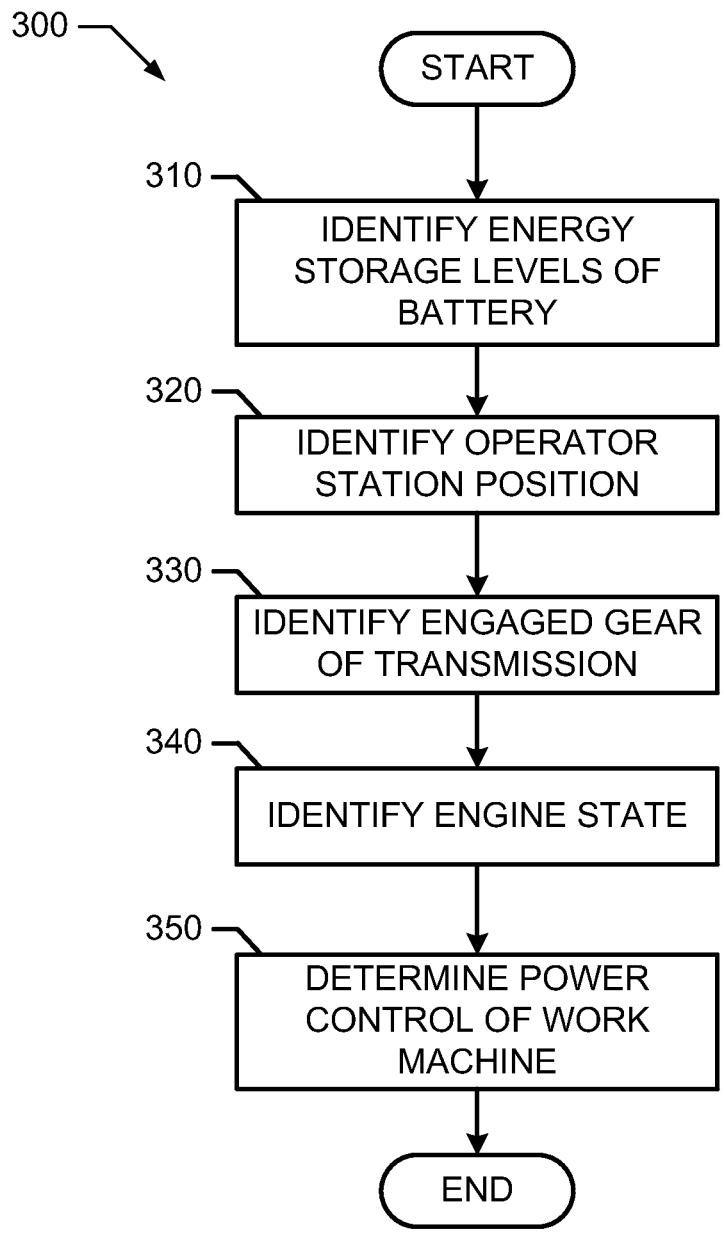
FIG. 3 is a flowchart of an example method, which may be implemented by the power controller of FIG. 2 using machine readable instructions to control power for the work machine of FIG. 1.

A flowchart and a state diagram representative of processes that may be implemented using example machine readable instructions for implementing the power controller 102 of FIG. 2 are shown in FIGS. 3 and/or 4. In this example, the machine readable instructions comprise a program for execution by a processor such as the processor 512 shown in the example processor platform 500 discussed below in connection with FIG. 5. The program may be embodied in software stored on a tangible computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 3 and the state diagram illustrated in FIG. 4, many other methods of implementing the example power controller 102 may alternatively be used. For example, the order of execution of the blocks or states may be changed, and/or some of the blocks and/or states described may be changed, eliminated, or combined.

As mentioned above, the example processes of FIGS. 3 and/or 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 3 and/or 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

An example process 300 that may be executed to implement the power controller 102 of FIG. 2 is represented by the flowchart shown in FIG. 3. With reference to the preceding figures and their associated descriptions, the process 300 of FIG. 3, upon execution (e.g., initiating the power controller 102 (perhaps following a startup of the work machine 100)), causes the power controller 102 to control power to one or more functions of the work machine 100.

At block 310, the battery monitor 252 identifies an energy level stored in the battery 110. For example, the battery monitor 252 retrieves energy storage level information from the battery 110 and forwards the information to the power analyzer 220. In the illustrated example, the power analyzer 220 may use a minimum and a maximum state of charge to determine whether the battery 110 is at an operable level. For example, when the battery reaches a maximum state of charge (e.g., 80% of storage capacity), the power analyzer 220 may instruct the battery 110 to no longer accept charging current from the generator. As another example, when the power analyzer 220 determines that the battery has reached a minimum state of charge (e.g., 20% of storage capacity), the power analyzer 220 may switch the power source for the function from the battery 110 to the ICE 108 and/or send a notification to the operator (e.g., via the user interface 240) that the energy storage level is low. In some examples during emergency conditions, the power analyzer 220 may enable the battery 110 to remain as the power source to control the backhoe 104 when the energy level is below the minimum state of charge. For example, such an emergency condition may be when the ICE 108 (or other auxiliary power source) is shut down or has experienced a failure, but the backhoe 104 is still in use.

At block 320, the station monitor 254 identifies a status of the operator station, such as a position of an operator seat or state of function controls. The station monitor 254 forwards the status information to the power analyzer 220. At block 330, the transmission monitor 256 identifies which gear (e.g., forward, neutral, reverse, etc.) is engaged in the transmission 112 and/or a transmission control setting for the transmission 112, and forwards the information to the power analyzer 220. At block 340, the engine monitor 258 determines whether the ICE 108 is running or not and if the ICE 108 is not running whether it was due to a failure (e.g., out of fuel, mechanical failure, unexpected shutdown, etc.) and forwards the information onto the power analyzer 220.

At block 350, the power analyzer 220 determines one or more of the functions of the work machine 100 are to be powered. In the example of FIG. 3, based on the status information received via blocks 310-340, the power analyzer 220 makes a determination as to whether the ICE 108 or the battery 110 are to be used to power the backhoe 104 and/or the loader 106. The function selector 230 may also determine which controls for a function of the work machine are to be enabled or disabled based on the status information received from the monitor 210. Such an example determination is described with respect to the state diagram of FIG. 4.

In some examples, a user may initiate an override procedure that disengages the power controller 102 and/or ends the process 300 of FIG. 3 and enables the operator to control the work machine 100 using standard implementations or power settings.

Figure 4:
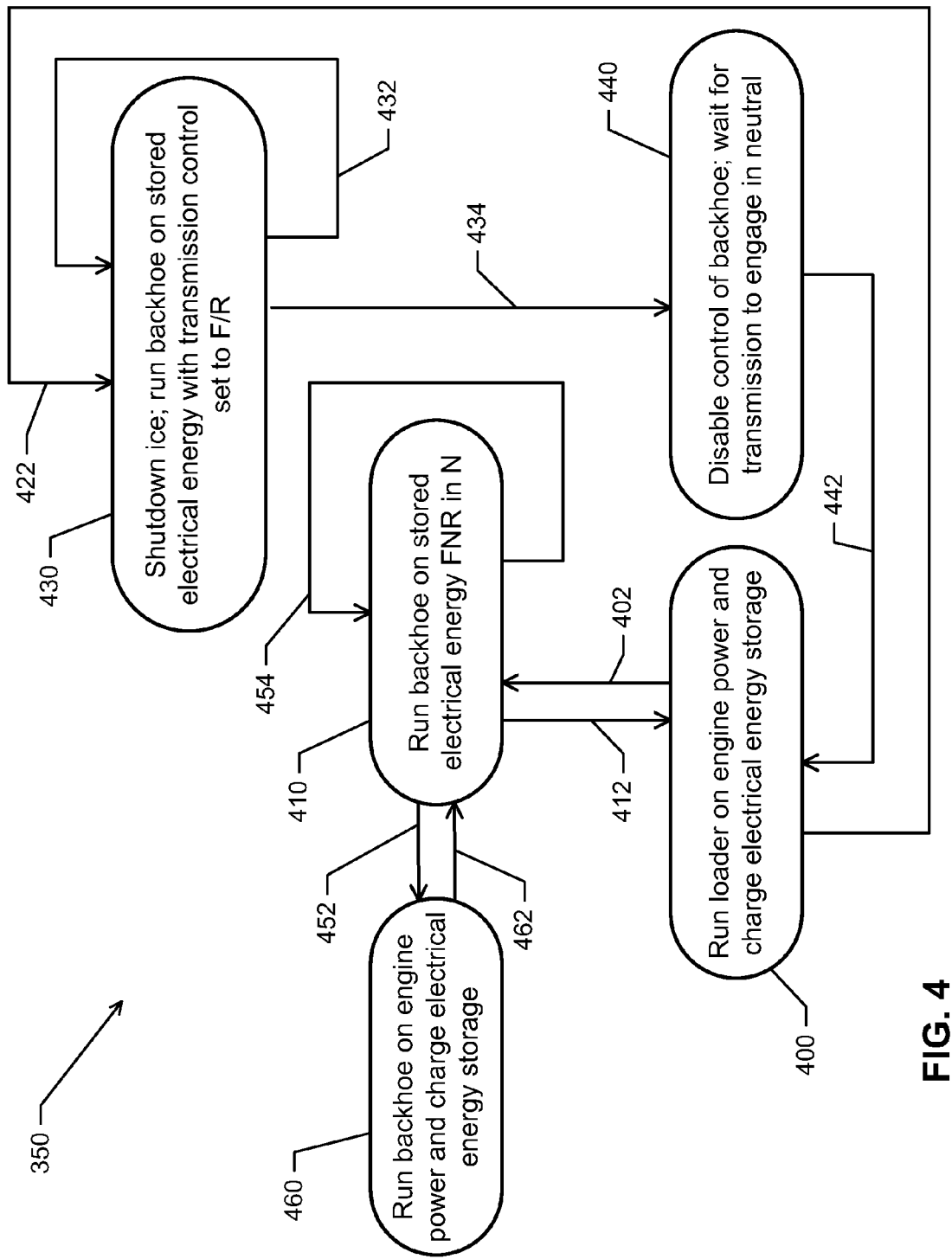
FIG. 4 illustrates an example state diagram, which may be implemented by the power controller of FIG. 2 using machine readable instructions to control power for the work machine of FIG. 1.

The state diagram of FIG. 4 represents an example process 350, which may be used to implement the block 350 of FIG. 3 and may be executed to implement the power controller 102 of FIG. 2 to determine control of the work machine 100. The power controller 102 runs the loader 106 of the work machine 100 using power from the ICE 108 and the battery 110 to store energy generated by the generator 114 (400). When the power analyzer 220 determines that the transmission 112 has been put into neutral and a seat of the operator station 118 has been positioned toward the backhoe 104 (402), the power analyzer 220 controls the work machine 100 to enable the backhoe 104 to run on power from the battery 110 via the electric motor 116 with the transmission 112 remaining in neutral (410). The function selector 230 may then enable control of the backhoe 104 and disable control of the loader 106. In some examples, the power analyzer 220, via the engine controller 264, shuts down the ICE 108 while the backhoe is powered using stored energy from the battery 110.

When the transmission 112 is engaged in forward or reverse and the seat position of the operator station 118 is directed toward the loader 106 (412), the power analyzer 220 enables the loader 106 to run on power from the ICE 108 and instructs the battery 110 via the battery controller 262 to enter a charging state (i.e., to store power generated by the generator 114) (400). The function selector 230 disables control to the backhoe 104 and enables control to the loader 106.

In FIG. 4, when a control (e.g., a control lever or control setting) of the transmission 112 remains in forward or reverse and the operator seat or controls of the operator station 118 are configured to control the backhoe 104 (e.g., the seat is turned toward the backhoe) (422), the power analyzer 220 shuts down the ICE 108 (e.g., using a "kill" switch), and enables the backhoe 104 to run on stored electrical energy from the battery 110 while the control of the transmission 112 remains in forward or reverse (430). The function selector 230 enables control of the backhoe 104 and disables controls of the loader 106. The power analyzer 220 will enable continued use of the backhoe 104 using power from the battery 110 when the work machine 100 is in an emergency state (432) (e.g., the ICE 108 is in an emergency state).

When the operator seat and/or operator controls in the operator station 118 are configured to control the loader 106 (e.g., the seat position is turned to face the loader 106) (434), the power analyzer 220 disables power to the backhoe 104 and instructs the user interface 240 to display an instruction to the operator to place the transmission into neutral (440). The function selector 230 may disable controls to the backhoe 104 (440). In some examples, at 440, the transmission 112 may be automatically put into neutral (and a brake may be applied) in response to instructions from the power analyzer 220. When the transmission 112 is put into neutral (442), the function selector 230 enables controls of the loader 106 and the power analyzer 220 runs the loader 106 using power from the ICE 108 and instructs the battery 110 to enter a charge state to store power from the generator 114 (400).

Returning now to 410 in the state diagram of FIG. 4, when the power analyzer 220 determines that a minimum state of charge (e.g., 20% of storage capacity) of the battery 110 has been reached (452), the power analyzer 220 disables power to operate the backhoe 104 and enables power from the ICE 108 to operate the backhoe 104 and/or instructs the battery 110 to enter a charge state to store energy generated by the generator 114. The function selector 230 also disables controls for the backhoe 104 and enables controls for the loader 106. In some examples, when the power analyzer 220 determines that the ICE 108 has been shut down, has experienced a failure, etc. (454), the power analyzer 220 enables the battery 110 to continue to provide power to operate the backhoe 104 regardless of whether the energy level of the battery 110 is below a minimum state of charge (410). Such enablement allows for safe operation of the backhoe 104 in the event of an emergency where the ICE 108 is inoperable, but the backhoe 104 still needs to operate (e.g., the backhoe 104 has a suspended load that should be safely set to the ground or unloaded). In some examples, the user interface 240 may indicate to the user that the work machine is in an emergency state and the energy storage levels of the battery 110 are low (454) in order to alert the operator to return work machine to a safe state (e.g., setting a bucket of the backhoe 104 or loader 106 to the ground).

When the power analyzer 220 determines that the battery 110 has reached a maximum state of charge (e.g., 80% storage capacity, 90% storage capacity, 100% storage capacity, etc.), the power analyzer 220 instructs the battery 110 to provide power to the backhoe 104 with the transmission 112 engaged in neutral (410). Power from the battery 110 may be used to power the backhoe 104 until the minimum state of charge is reached.

Figure 5:
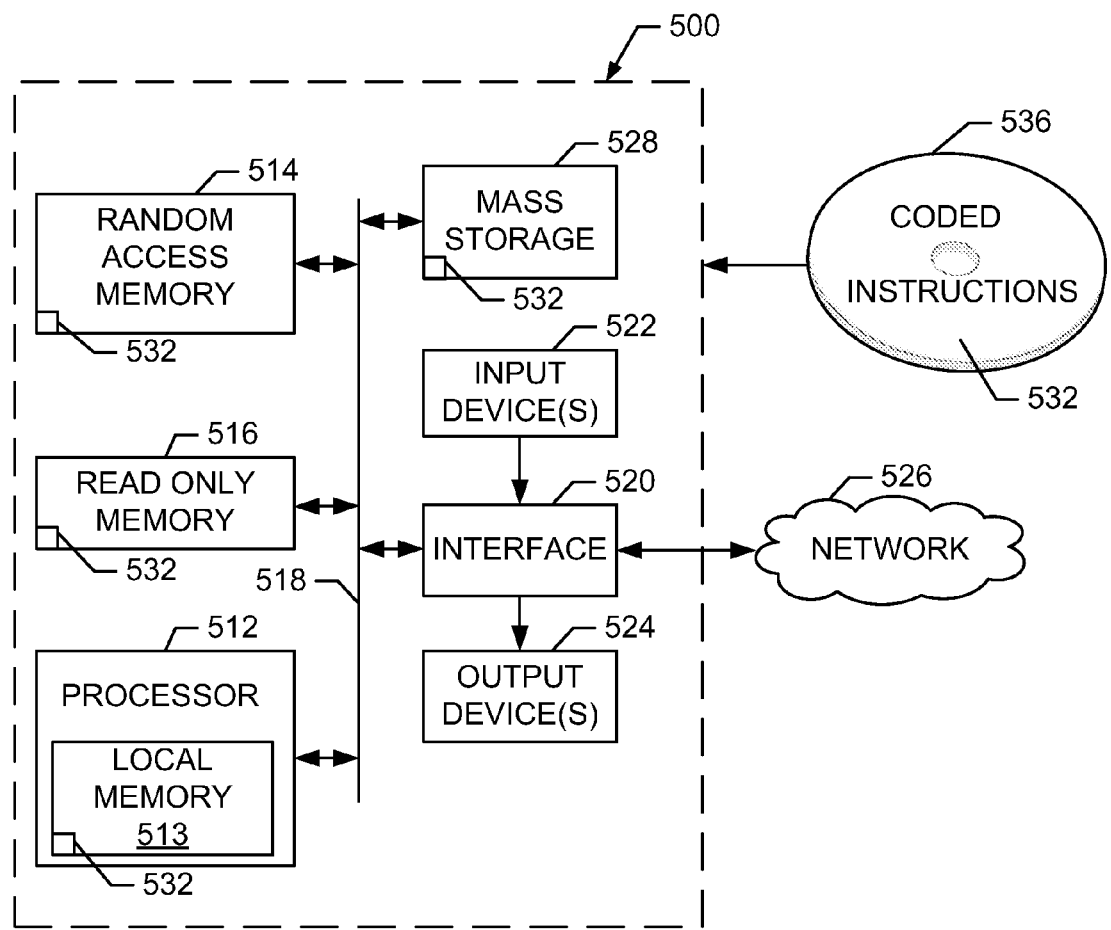
FIG. 5 is a block diagram of an example processor platform to execute or utilize the method of FIG. 3 and other methods to implement the example power controller FIG. 2.

FIG. 5 is a block diagram of an example processor platform 500 capable of executing the instructions of FIG. 5 to implement the power controller 102 of FIGS. 1 and/or 2. The processor platform 500 can be, for example, a server, a personal computer, a mobile device (e.g., a cell phone, a smart phone, a tablet such as an iPad™), a personal digital assistant (PDA), an Internet appliance, or any other type of computing device.

The processor platform 500 of the illustrated example includes a processor 512. The processor 512 of the illustrated example is hardware. For example, the processor 512 can be implemented by one or more integrated circuits, logic circuits, microprocessors or controllers from any desired family or manufacturer.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), and/or speakers). The interface circuit 520 of the illustrated example, thus, typically includes a graphics driver card, a graphics driver chip or a graphics driver processor. The input device(s) and output device(s) may implement the user interface 240 of FIG. 2.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

The coded instructions 532 for the processes of FIGS. 3 and/or 4 may be stored in the mass storage device 528, in the volatile memory 514, in the non-volatile memory 516, and/or on a removable tangible computer readable storage medium such as a CD or DVD.

From the foregoing, it will appreciate that the above disclosed methods, apparatus and articles of manufacture provide a power controller to enable control of a backhoe using power from a battery and/or an internal combustion engine. Accordingly, this hybrid battery/engine configuration allows for safe operation of the work machine (e.g., in emergency states when the internal combustion engine experiences a failure) as well as quieter operation of the work machine when operating the backhoe.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
a work machine including a first ground-engagable implement, a second ground-engagable implement, and a ground engaging element, the first ground-engagable implement being independently movable relative to the ground engaging element, the second ground-engagable implement being independently movable relative to the ground engaging element, the ground engaging element to be used to maneuver the work machine, the work machine including:
a seat monitor to identify a seat of the work machine as facing a first direction or a second direction, the first direction indicative of the first ground-engagable implement to be powered, the second direction indicative of the second ground-engagable implement to be powered;
a battery monitor to identify an energy storage level of an energy storage device; and
a power analyzer to:
cause a function of the first ground-engagable implement to be powered using power from the energy storage device and to cause an engine to be shut down when the seat monitor identifies the seat as facing the first direction, a transmission setting of the work machine corresponds to a first transmissions setting, and the energy storage level satisfies a first threshold; and
cause the function of the first ground-engagable implement to be powered using power from an engine and to cause the energy storage device to be charged by the engine when the seat monitor identifies the seat as facing the first direction, the transmission setting of the work machine corresponds to the first transmission setting, and the energy storage level satisfies a second threshold, the first threshold being different than the second threshold.

2. The apparatus of claim 1, wherein the power analyzer is to cause the function of the first ground-engagable implement to be powered using power from the energy storage device when the energy storage level is between a maximum energy state threshold and a minimum energy state threshold and the first transmission setting of the work machine is neutral.

3. An apparatus for controlling a work machine, comprising:
a seat monitor to identify a seat of the work machine as facing a first direction or a second direction, the first direction indicative of a ground-engagable implement being powered, the second direction indicative of the ground-engagable implement not being powered;
a battery monitor to identify an energy storage level of an energy storage device; and
a power analyzer to:
control a function of the ground-engagable implement using power from the energy storage device and to cause an engine to be shut down when the seat monitor identifies the seat as facing the first direction, a transmission setting of the work machine corresponds to a transmission setting, and the energy storage level satisfies a first threshold; and
control the function of the ground-engagable implement using power from the engine and to cause the energy storage device to be charged by the engine when the seat monitor identifies the seat as facing the first direction, the transmission setting of the work machine corresponds to the first transmission setting, and the energy storage level satisfies a second threshold, the first threshold being different than the second threshold.

4. The apparatus of claim 1, wherein when the seat monitor identifies the seat as facing the second direction, the power analyzer to control a function of the second ground-engagable implement using power from the engine, when the seat monitor identifies the seat as facing the first direction and the energy storage level satisfies the first threshold, the power analyzer is to shut down the engine when (1) a transmission setting of the work machine is in forward or reverse and (2) an operator station of the work machine is to control the function of the first ground-engagable implement.

5. The apparatus of claim 1, wherein the function is a first function, further including a function selector, the function selector is to disable control of the first function when an operator station is to control a second function of the second ground-engagable implement.

6. An apparatus for controlling a work machine, comprising:
a seat monitor to identify a seat of the work machine as facing a first direction or a second direction, the first direction indicative of a first ground-engagable implement to be powered, the second direction indicative of a second ground-engagable implement to be powered;
a battery monitor to identify an energy storage level of an energy storage device;
a power analyzer to determine to:
control a first function of the first ground-engagable implement using power from the energy storage device and to cause an engine to be shut down when the seat monitor identifies the seat as facing the first direction, a transmission setting of the work machine corresponds to a first transmission setting, and the energy storage level satisfies a first threshold; and
control the first function of the first ground-engagable implement using power from an engine and to cause the energy storage device to be charged by the engine when the seat monitor identifies the seat as facing the first direction, the transmission setting of the work machine corresponds to the first transmission setting, and the energy storage level satisfies a second threshold, the first threshold being different than the second threshold; and
a function selector to disable control of the first function and enable control of a second function of the second ground-engagable implement when the seat monitor identifies the seat as facing the second direction, the engine to be used to power the second function, the energy storage device not to be used to power the second function.

7. A method, comprising:
identifying a seat of a work machine as facing a first direction, the first direction indicative of a first ground-engagable implement to be powered, a second direction of the seat indicative of a second ground-engagable implement to be powered;
identifying an energy storage level of an energy storage device of the work machine as satisfying a first threshold;
causing a function of the first ground-engagable implement to be powered using power from the energy storage device and causing an engine of the work machine to be shut down in response to the seat being identified as facing the first direction, a transmission setting of the work machine corresponds to a first transmission, and the energy storage level satisfying the first threshold;
identifying the energy storage level of the energy storage device of the work machine as satisfying a second threshold, the first threshold being different than the second threshold; and
causing, via a power analyzer: the function of the first ground-engagable implement to be powered using power from the engine and causing the energy storage device to be charged by the engine in response to the seat being identified as facing the first direction, the transmission setting of the work machine corresponds to a first transmission setting, and the energy storage level satisfying the second threshold, the first ground-engagable implement being independently movable relative to a ground engaging element of the work machine, the ground engaging element to be used to maneuver the work machine.

8. The method of claim 7, wherein the function is to be powered using power from the energy storage device when the energy storage level is between a maximum energy state threshold and a minimum energy state threshold and the first transmission setting of the work machine is neutral.

9. The method of claim 7, further including:
identifying the engine being in an emergency state; and
powering the function using power from the energy storage device until the work machine has reached a safe state.

10. A method for controlling a work machine, comprising:
identifying a seat of a work machine as facing a first direction, the first direction indicative of a first ground-engagable implement to be powered, a second direction of the seat indicative of a second ground-engagable implement to be powered;
identifying an energy storage level of an energy storage device as satisfying a first threshold;

causing a first function of the first ground-engagable implement to be powered using power from the energy storage device and causing an engine to be shut down in response to the seat being identified as facing the first direction, a transmission setting of the work machine corresponding to a first transmission setting, and the energy storage level satisfying the first threshold;

identifying the energy storage level of an energy storage device of the work machine as satisfying a second threshold, the first threshold being different than the second threshold;

causing the first function of the work machine to be powered using power from the engine and causing the energy storage device to be charged in response to the seat being identified as facing the first direction, a transmission setting of the work machine corresponds to a first transmission setting, and the energy storage level satisfying the second threshold; and disabling control of the first function when an operator station is to control a second function separate from the first function.

11. A tangible computer readable storage medium comprising instructions that when executed cause a work machine to at least:

identify a seat of a work machine as facing a first direction, the first direction indicative of a ground-engagable implement being powered, a second direction of the seat indicative of the ground-engagable implement not being powered;

identify an energy storage level of an energy storage device as satisfying a first threshold;

cause a function of the ground-engagable implement to be powered using power from the energy storage device and cause an engine to be shut down in response to the seat being identified as facing the first direction, a transmission setting of the work machine corresponding to a first transmission setting, and the energy storage level satisfying the first threshold;

identify the energy storage level of the energy storage device as satisfying a second threshold, the first threshold being different than the second threshold; and cause the function of the ground-engagable implement of the work machine to be powered using power from the engine and cause the energy storage device to be charged by the engine in response to the seat being identified as facing the first direction, the transmission setting of the work machine corresponds to the first transmission setting, and the energy storage level satisfying the second threshold, the ground-engagable implement being independently movable relative to a ground engaging element of the work machine, the ground engaging element to be used to maneuver the work machine.

12. A storage medium of claim 11, wherein the function is to be powered using power from the energy storage device when the energy storage level is between a maximum energy state threshold and a minimum energy state threshold and the first transmission setting of the work machine is neutral.

13. A storage medium of claim 11, wherein the instructions when executed further cause the machine to:
identify the engine as being in an emergency state; and
power the function using power from the energy storage device until the work machine has reached a safe state.

14. The apparatus of claim 1, wherein the first ground-engagable implement is at least one of a backhoe, a loader, a power-take off, a hitch, an implement, or a plow.

15. The apparatus of claim 1, wherein the engine is to be used to drive the ground engaging element.

16. The apparatus of claim 1, wherein the ground engaging element includes wheels.

17. The apparatus of claim 1, wherein the work machine includes a first end and a second end opposite the first end, the first ground-engagable implement being disposed immediately adjacent the first end, the second ground-engagable implement being disposed immediately adjacent the second end.

18. The apparatus of claim 17, wherein the first ground-engagable implement is a backhoe and the second ground-engagable implement is a loader.

19. The apparatus of claim 1, wherein the first transmission setting is neutral.

* * * * *

UNITED STATES PATENT AND TRADEMARK OFFICE
CERTIFICATE OF CORRECTION

PATENT NO.         : 9,441,347 B2                                            Page 1 of 1
APPLICATION NO.    : 13/959342
DATED              : September 13, 2016
INVENTOR(S)        : West It is certified that error appears in the above-identified patent and that said Letters Patent is hereby corrected as shown below:

In the Claims

Column 12, Line 33 Claim 7: insert --setting-- after "transmission"

Column 13, Line 16 Claim 10: change "corresponds" to --corresponding--

Signed and Sealed this
Seventh Day of February, 2017

Michelle K. Lee
*Director of the United States Patent and Trademark Office*